United States Patent
Matches et al.

(10) Patent No.: US 6,493,985 B2
(45) Date of Patent: Dec. 17, 2002

(54) COLLAPSIBLE BAIT TRAP

(76) Inventors: Charles C. Matches, 424 Redmond Ave., Oakhurst, NJ (US) 07755; Keith J. Matches, 15 Manor Dr., Princton, NJ (US) 08540

( * ) Notice: Subject to any disclaimer, the term of this patent is extended or adjusted under 35 U.S.C. 154(b) by 0 days.

(21) Appl. No.: 09/919,013

(22) Filed: Jul. 31, 2001

(65) Prior Publication Data

US 2002/0095855 A1 Jul. 25, 2002

Related U.S. Application Data

(60) Provisional application No. 60/248,957, filed on Nov. 16, 2000.

(51) Int. Cl.[7] ............................................. A01K 69/10
(52) U.S. Cl. ................................................ 43/105; 43/7
(58) Field of Search .............................. 43/7, 56, 100, 43/102, 103, 105, 41, 44.2; 135/16, 65, 37; 160/53; 70/59; D08/382, 387; 81/901; 212/276; 29/65, 896.8

(56) References Cited

U.S. PATENT DOCUMENTS

| | | | | |
|---|---|---|---|---|
| 460,791 A | * | 10/1891 | Metzger | |
| 748,655 A | * | 1/1904 | Rohrer | |
| 1,463,062 A | * | 7/1923 | Roberts | |
| 4,019,462 A | * | 4/1977 | Palfalvy | 119/51.5 |
| 4,134,225 A | * | 1/1979 | Welch | 43/100 |
| 4,608,571 A | * | 8/1986 | Luly | 343/781 P |
| 4,627,210 A | * | 12/1986 | Beauliue | 52/646 |
| 4,730,411 A | * | 3/1988 | Katis | 43/105 |
| 5,566,499 A | * | 10/1996 | Washeka | 43/100 |
| 6,105,215 A | * | 8/2000 | Lee | 24/458 |
| 6,241,105 B1 | * | 6/2001 | Pomper | 211/85.2 |
| 6,325,773 B1 | * | 12/2001 | Opel | 602/26 |

* cited by examiner

Primary Examiner—Charles T. Jordan
Assistant Examiner—Bret Hayes
(74) Attorney, Agent, or Firm—Robert M. Skolnik

(57) ABSTRACT

A collapsible bait trap has a support assembly for netting support arms. The support has a plurality of notches in which the arms are connected. A rotatable gear is attached to the notched support and rotatable from a first position where gear teeth cover the notches to prevent the arms from collapsing thereby holding the netting in its open position, to a second position where the gear teeth do not cover the notches so that the support arms are free to collapse thereby moving the netting to its closed position for convenient storage.

13 Claims, 5 Drawing Sheets

COLLAPSIBLE BAIT TRAP

CROSS-REFERENCE TO RELATED APPLICATIONS

This application discloses and claims the invention described in U.S. Provisional Application No. 60/248,957, filed Nov. 16, 2000.

BACKGROUND OF THE INVENTION

1. Field of the Invention

The present invention relates to a collapsible bait trap.

2. Description of the Related Art

Roberts, U.S. Pat. No. 1,463,062 discloses a bait trap, which has a folding arrangement for four support arms (shown in FIG. 2).

Haseman, U.S. Pat. No. 2,603,031, shows a collapsible bait trap where netting is mounted on a base ring in two sections. The base ring pivots about end supports.

Rabin, U.S. Pat. No. 2,911,755, discloses a structure similar to Haseman in that two pivoting rings are flat in the open or catching position and closed in the trapping position.

Bott, U.S. Pat. No. 4,143,480, shows a trap operating similarly to Rabin but without the use of pivoting rings; rather, interlocking support rods are connected across the top of the netting.

Katis, U.S. Pat. No. 4,730,411 discloses a collapsible bait trap, which is shown in folded position in FIG. 2 and in open position in FIG. 1. This uses a different support/collapsible mechanism than the present invention.

Glatzer, U.S. Pat. No. 5,555,666 discloses a bait trap similar to that shown in FIGS. 1–2 of Bott and described by Bott as well known prior art.

Murguido, U.S. Pat. No. 5,737,869, shows a fixed assembly in FIG. 4, which is not collapsible.

SUMMARY OF THE INVENTION

The present invention is bait trap that when not in use collapses and is easily stowed in the bottom of a fisherman's tackle box. When in use, the bait trap is lowered just below the surface of a body of water. Small pieces of bread are then dropped into and around the trap to attract minnows. When minnows either swim into or above the trap, it is quickly pulled out of the water. The minnows are then unable to escape the trap's netting. The construction of the bait trap also permits the minnows to remain in the trap until needed so that an additional container to store the minnows is unnecessary.

In order to open the trap for use, the following occurs: 1. lower all netting spokes 8 from their vertical or folded position until they are all resting in a horizontal position with the spoke disk 6; 2. turn the adjustable gear 5 until its teeth completely cover all of the spoke disks 6 slots; 3. in one embodiment, tighten wing nut 3 onto the adjustable gear 5 so that the netting spokes 8 are now locked into place and the bait trap is ready for use.

In order to collapse the bait trap and allow for convenient storage with a tackle box, the following occurs: 1. loosen the wing nut 3; 2. turn the adjustable gear 5 until its teeth are not blocking any of the spoke disk 6 slots; 3. turn the entire trap upside down to cause the netting spokes 8 along with the netting 9 to fall into a vertical position; 4. wrap the NYLON® cord 1 around the trap so that it is now ready for convenient storage within a tackle box.

The principal object and advantage of the invention is the provision of a collapsible bait trap.

Another object and advantage of the apparatus of the present invention is the provision of a collapsible bait trap having a locking arrangement to secure the netting in an open position and to provide for convenient storage of the netting in a collapsed position.

A still further object and advantage of the present invention is the provision of a collapsible bait trap where the apparatus is locked and unlocked by rotation of a gear.

Another object and advantage of the present invention is the provision of a bait trap, which has a locking arrangement to secure the net in an open position.

A still further object and advantage of the method and apparatus of the present invention is the provision of a bait trap, which is easy to use and is simple to dissemble for cleaning.

BRIEF DESCRIPTION OF THE DRAWINGS

These as well as further objects and advantages of the invention will become apparent to those skilled in the art from a review of the following detailed specification reference being made to the accompanying drawings in which.

DETAILED DESCRIPTION OF THE INVENTION

Figure 1:
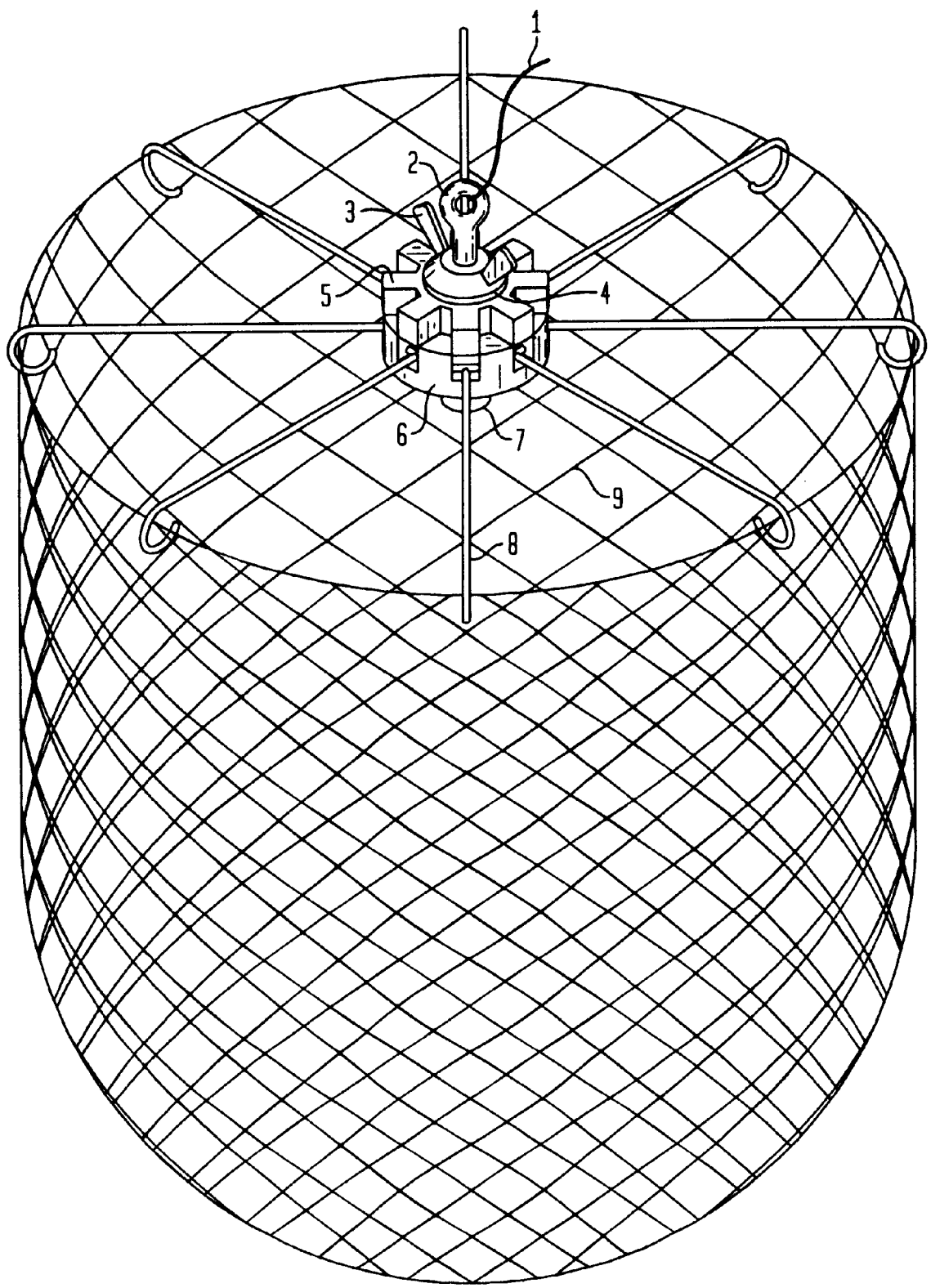
FIG. 1 is a perspective view of the collapsible bait trap of the present invention using one form of attachment.
Figure 2:
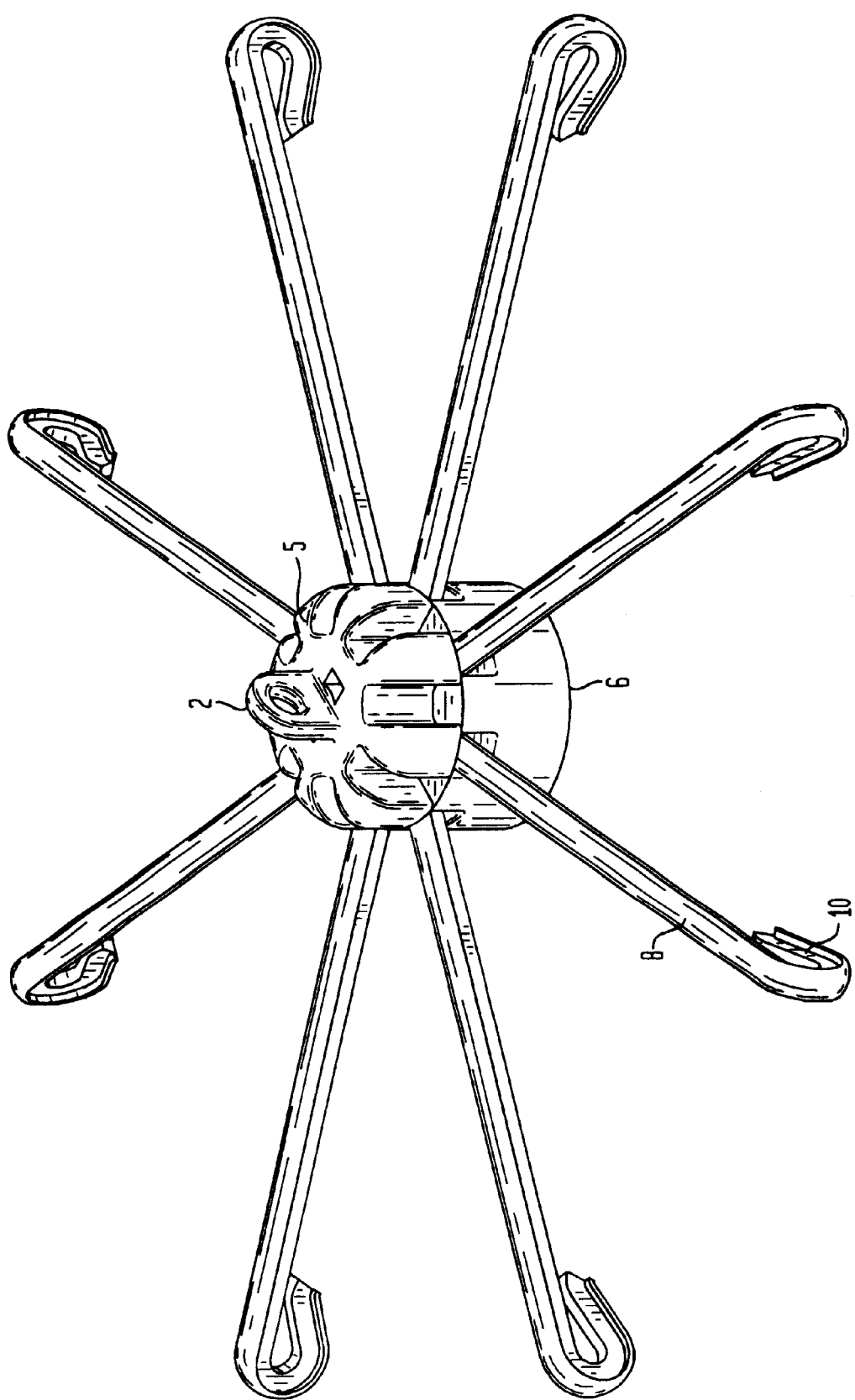
FIG. 2 is a perspective view of a portion of the apparatus shown in FIG. 1 using another form of attachment.
Figure 3:
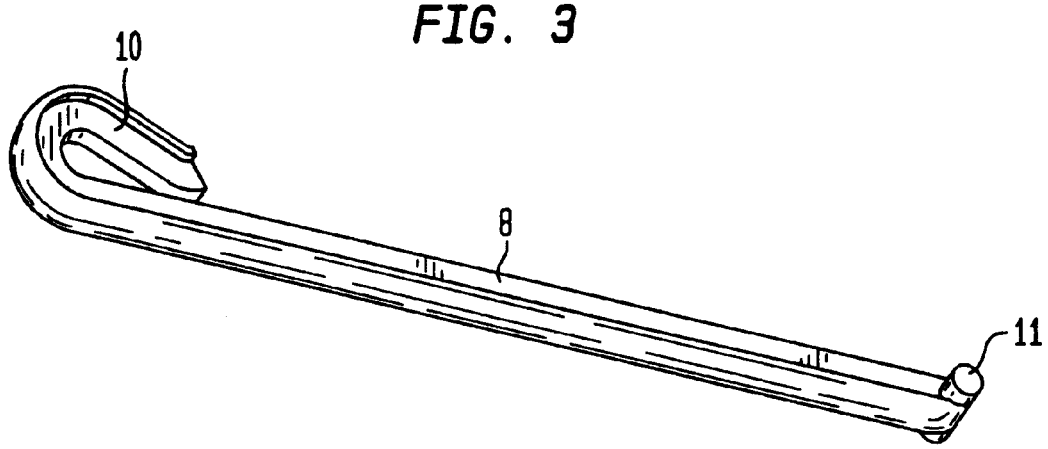
FIG. 3 is a perspective view of one of the netting spokes shown in FIGS. 1–2.

FIG. 1 is a perspective view of the collapsible bait trap of this invention. The apparatus of FIG. 1 uses a locking arrangement consisting of wing nut 3, washer 4 and end bolt 7 to lock and unlock adjustable gear 5 and spoke disk 6. In FIGS. 1–7, the following reference numerals denote the following parts of the invention:

1 NYLON® polymer cord
2 eye
3 wing nut
4 washer
5 adjustable gear
6 spoke disk
7 nut
8 netting spokes
9 NYLON® polymer netting
10 loop
11 cylindrical pin
12 flexible spring clip arm
13 flexible spring clip arm
14 tab
14' tab
15–18 tab apertures
19–20 slots
21–22 hooks
23 cylinder The trap includes netting 9 connected to a plurality of netting spokes 8. The spokes 8 are foldably mounted in spoke disk 6. The spoke disk 6 is a solid cylindrical structure having a single continuous hole in its center (FIG. 1) or a centrally located cylindrical shaft, 23, FIG. 4), and eight equally spaced slots on its surface. Each slot contains two small holes or slots, 19, 20 in FIG. 7, for permitting netting spokes 8 to be snap fitted therein. As shown in FIGS. 2–3, the netting spokes 8 each have a loop or hook 10 formed at one end thereof, and a "T" consisting of two circular cylindrical rods 11 formed at the opposite end thereof. The rods 11 snap into the slots 19, 20.

The embodiment of the adjustable gear 5 shown in FIG. 1 has a single hole in its center for receiving and supporting a locking bolt therein. The barrel of the locking bolt (not shown) is locked into place using wing nut 3, washer 4 and end nut 7. The locking bolt has an eye 2 formed therein for receiving a cord 1 to support the trap when is it placed in the water.

Figure 4:
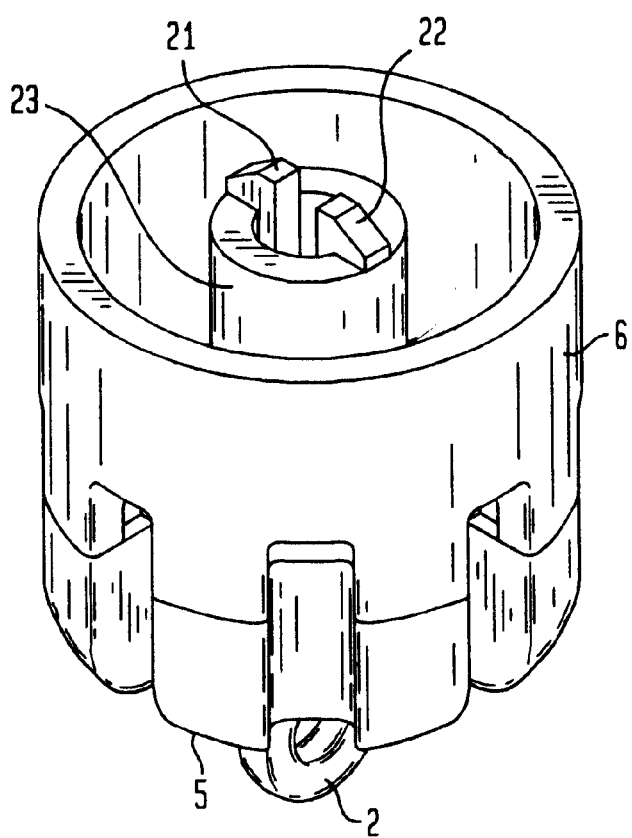
FIG. 4 is a perspective view of the bottom of the assembly of a spoke disk and adjustable gear shown in FIG. 2.
Figure 5:
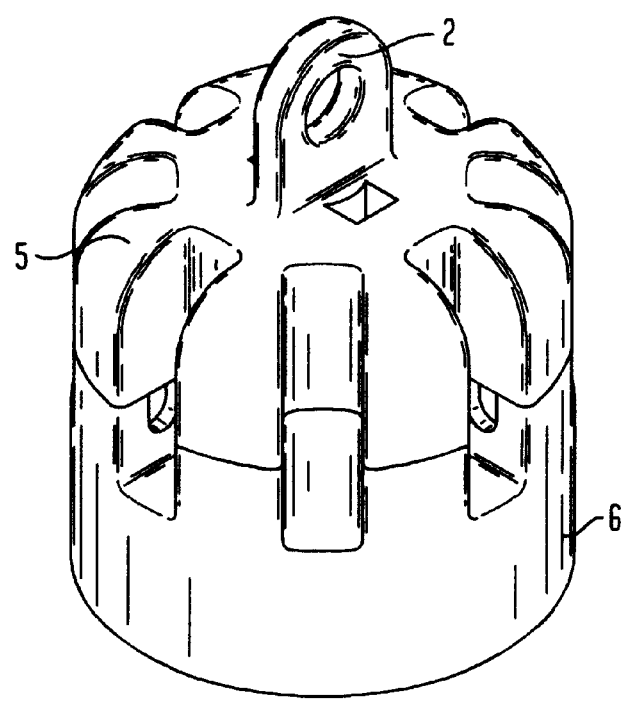
FIG. 5 is perspective view similar to that of FIG. 4 of the top of the assembly.
Figure 6:
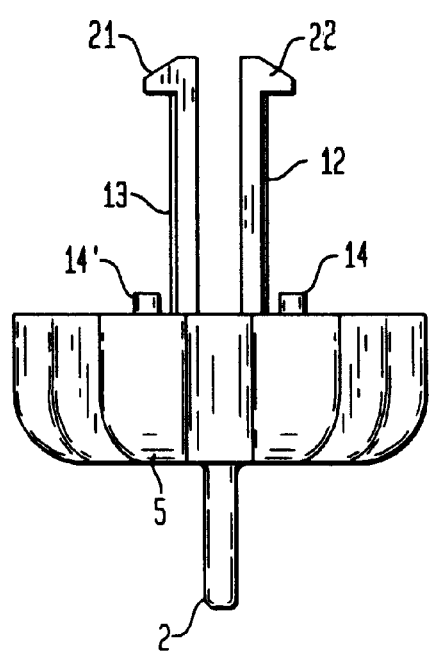
FIG. 6 is side view of the adjustable gear of FIG. 2.

A different locking arrangement is employed in the embodiment shown in FIGS. 2, and 4–7. As shown in FIG. 2, eight netting spokes 8 are mounted in spoke disk 6 and locked into place by the rotation of adjustable gear 5 to the position shown in FIG. 2. The locking arrangement of FIGS. 2 and 4–7 uses a spring clip having arms 12 and 13 (FIGS. 4 and 6). As shown in FIG. 6, arms 12 and 13 are affixed to the underside of adjustable gear 5. Each arm 12 and 13 has a hook 21 and 22 respectively formed at the opposite end thereof. As shown in FIG. 4, each hook 21 and 22 serve to attach the adjustable gear 5 to a supporting cylinder 22 formed integrally with the spoke disk 6. As will now be seen, insertion of the arms 12 and 13 and the hooks 21 and 22 into the cylinder 23 until the hooks reach the position shown in FIG. 4, serves to rotatably attach the disk 6 and the gear 5. As shown in FIG. 5, an aperture 2 is attached to the side of gear 5 opposite the location of the arms, 12 and 13, which serves the same function as aperture 2 in FIG. 1.

As shown in FIG. 6, a total of four tabs (two of which 14 and 14' are shown) are formed on gear 5 adjacent to and about the periphery of arms 12 and 13. The tabs 14, 14' fit within oppositely located apertures 15, 17 or 16, 18 (shown in FIG. 7) formed on spoke disk 6. The tabs and the apertures serve to align the joining of and limit the degree of relative rotation between gear 5 and disk 6.

Figure 7:
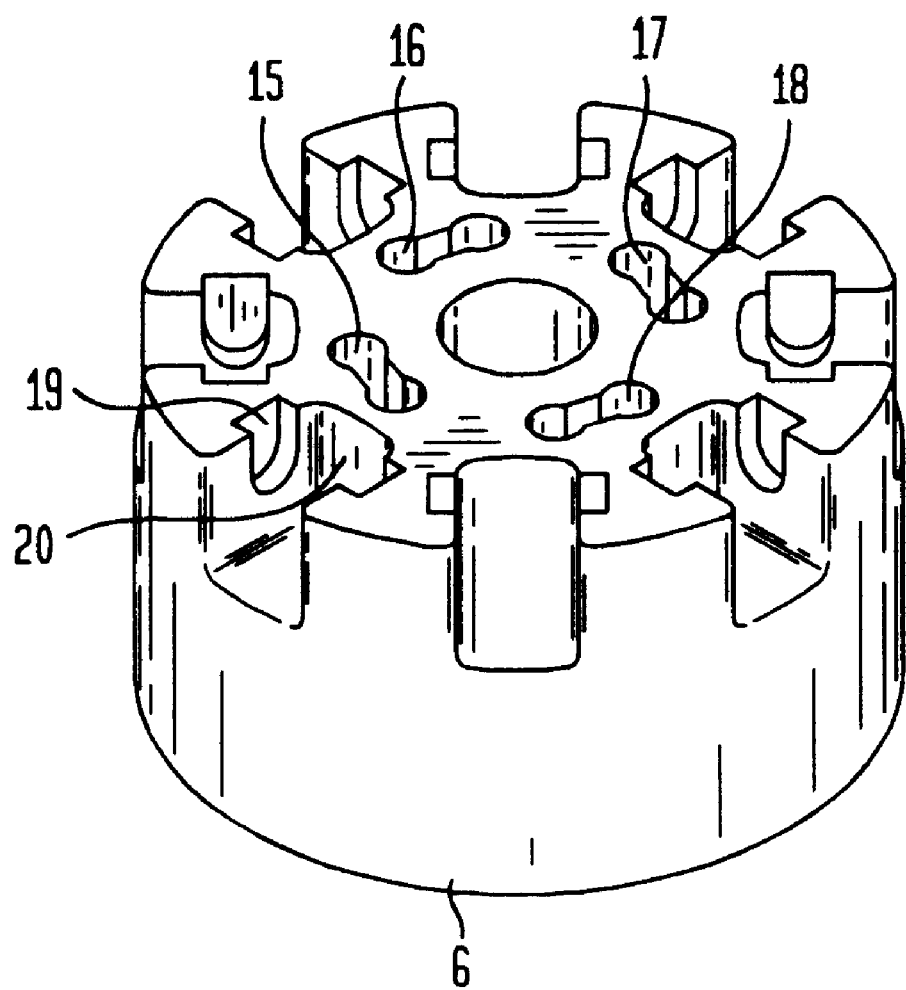
FIG. 7 is perspective view of the spoke disk of FIG. 2.

Also shown in FIG. 7 are the support notches 19 and 20 formed into the walls of each notch of the spoke disk 6. The cylindrical rods 11 of the "T" shown in FIG. 3 snap into support notches 19 and 20 so that each netting spoke is moveable within the notches 19 and 20 from a fully extended position shown in FIGS. 1–2 (spoke disk 6 and gear 5 are in the "locked" position) to a collapsed position when gear 5 and spoke disk 6 are in the unlocked position shown in FIGS. 4–5. The notches in the gear 5 are sufficiently wide to cover at least one of the slots in each slot pair 19, 20 so as to prevent in the snap fitting "T" cylindrical rods 11 from falling out of the slots.

In the embodiment shown in FIG. 1, the wing nut 3 is loosened permitting the gear 5 and the disk 6 to be rotated relative to each other from the locked position shown in FIG. 1 to an unlocked position (not shown) where the netting spokes 8 are permitted to pivot approximately 90° to a folded position where the netting spokes are positioned vertically with respect to the showing in FIG. 1.

A still further alternative locking arrangement for the adjustable gear 5 and spoke disk 6 employs locking nut 7 and the through bolt attached to the underside of adjustable gear 5. The through bolt passes through a central hole in spoke disk 6. Wing nut 3 and washer 4 are not required in this locking arrangement.

As modifications to the foregoing may be made without departing from the spirit and scope of our invention, what is sought to be protected is set forth in the appended claims.

We claim:

1. A collapsible bait trap comprising; a net, a plurality of spokes connected to said net for supporting said net in an open position and in a closed position; support means connected to said spokes for securing said spokes when said net is in said open position and permitting said spokes to move said net to said closed position, said support means including a spoke disk having a plurality of spoke slots formed therein for movably supporting said spokes therein, a gear rotatably attached to said spoke disk, said gear having a plurality of teeth separated by a plurality of gear slots formed therein, said teeth covering said spoke slots when said net is in said open position and said gear slots permitting said spokes to move said net to said closed position.

2. The collapsible bait trap of claim 1 wherein each of said spokes has two ends, a hook formed at one end of said spoke for supporting said net, and connection means formed at the other end of said spoke for connecting said spoke to said support means.

3. The collapsible bait trap of claim 1 further including a plurality of apertures formed on said spoke disk, a plurality of tabs formed on said gear disk for engaging said apertures, said apertures and said tabs limiting the distance said gear disk can move relative to said spoke disk.

4. The collapsible bait trap of claim 1 further including mounting means centrally located in said spoke disk and in said gear disk for mounting said disks upon each other.

5. The collapsible bait trap of claim 4 wherein said mounting means includes locking means connected to said mounting means for locking said disks when said net is in either said closed or said open position.

6. The collapsible bait trap of claim 4 wherein said mounting means includes a spring clip having two legs for rotatably engaging a portion of said spoke disk.

7. The collapsible bait trap of claim 4 wherein said mounting means includes a bolt attached to said gear disk and a nut mounted to said bolt for securing said spoke disk to said gear disk.

8. The collapsible bait trap of claim 4 wherein said mounting means includes an eye attached to gear disk for securing a line to said bait trap.

9. A collapsible bait trap comprising; a net, a plurality of spokes connected to said net for supporting net in an open position and in a closed position; support means connected to said spokes for securing said spokes when said net is in said open position and permitting said spokes to move said net to said closed position, said support means including a first disk for supporting said spokes therein and a second disk, rotatably mounted to said first disk, having means formed thereon securing said spokes when said net is in said open position and permitting said spokes to collapse said net into said closed position when said second disk is in a second position.

10. The collapsible bait trap of claim 9 further including means connected to said first and second disks for rotatably mounting said disks adjacent to each other.

11. The collapsible bait trap of claim 10 further including means connected to said disks for limiting the degree of relative rotation of said disks, one to the other.

12. The collapsible bait trap of claim 11 wherein said means for limiting rotation includes at least two tabs formed in one of said disks and at least two apertures formed in the other of said disks, said tabs fitting into said apertures when said disks are mounted adjacent to each other.

13. The collapsible bait trap of claim 11 further including an eye connected to said disks and a cord connected to said eye for supporting said bait trap in the water.

* * * * *